R. RAMSEY.

Fence Post.

No. 2,945.

Reissued May 26, 1868.

Witnesses

J. W. Matter

L. A. Ellis.

Inventor

Robt. Ramsey per

F. A. Alexander

Atty

N. PETERS, Photo-Lithographer, Washington, D. C.

United States Patent Office.

ROBERT RAMSEY, OF NEW WILMINGTON, PENNSYLVANIA.

*Letters Patent No.* 72,086, *dated December* 10, 1867; *reissue No.* 2,945, *dated May* 26, 1868.

IMPROVEMENT IN FENCE-POSTS.

The Schedule referred to in these Letters Patent and making part of the same.

TO ALL WHOM IT MAY CONCERN:

Be it known that I, ROBERT RAMSEY, of New Wilmington, in the county of Lawrence, and State of Pennsylvania, have invented a new and useful Improvement in Fence-Posts; and I do hereby declare the following to be a full, clear, and exact description thereof, reference being had to the accompanying drawings, and to the letters of reference marked thereon, which form a part of this specification, and in which—

Figure 1:
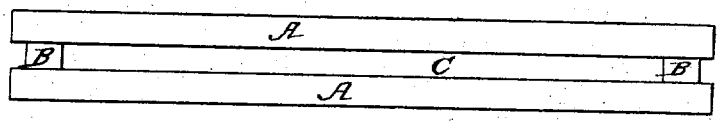

Figure 1 is a plan of the sills, and

Figure 2:
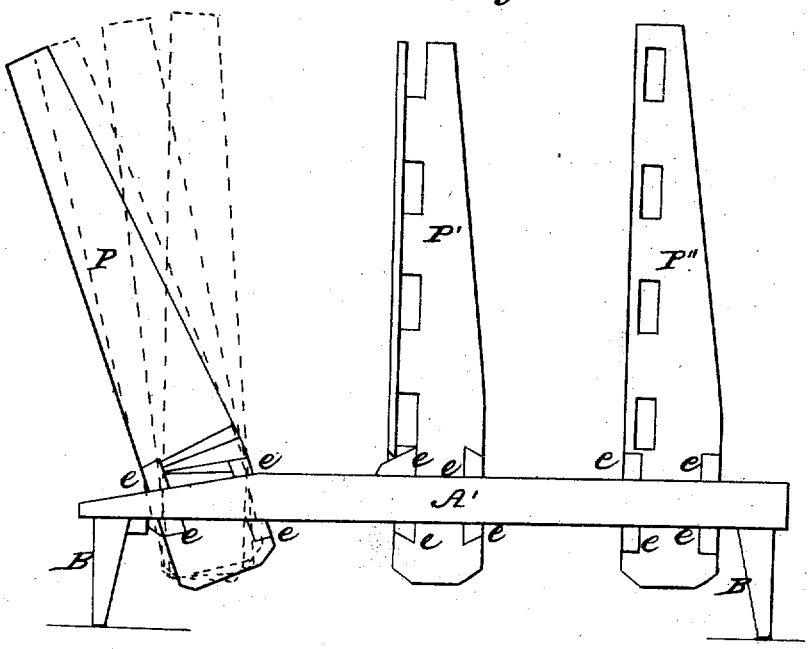

Figure 2 a side view of the same, also of the posts.

The nature of this invention consists, first, in having square or dove-tail gains cut on the sides of the posts at their lower ends, in order to provide a suitable compensation for any unevenness of ground; second, in the combination of posts provided with square or dove-tail grooves with parallel sills, when said posts are secured by means of keys above and below the sills, substantially as hereinafter set forth.

To enable others skilled in the art to avail themselves of the benefits of my invention, I will now describe its construction and operation.

A A′ represent the sills, supported upon brackets or pedestals, B B, and placed in a position parallel to each other, so as to have a narrow space, C, between them. The posts P P′ P″ are stepped in the space C, and each one is confined in position by four keys, *e e e e*, two above and two below the sills, the keys resting against the upper and under surfaces of the sills, and their cross-section being of the form shown clearly by the end view of them in fig. 2. At the point where these keys are designed to pass, a square or dove-tail gain is made on each side of the post, one end of the gain extending above and the other below the sills. The keys *e e* fit accurately into these gains, and when in place, hold the posts firmly in position, as shown in fig. 2.

It is evident that each post can be set higher or lower by simply inserting larger keys above or below the sills, or the posts can be adjusted at any inclination by inserting a large key above the sills on one side of the posts, and a large one on the other side, below the sills, the other keys being made small; or a like result may be produced by adapting the gains in the posts which stand upon a slope or hill to the inclination of the ground, as fully represented in fig. 2, post P.

A fence thus constructed may be easily and quickly adjusted or taken down, while its compensating features render it peculiarly suitable and desirable for farming purposes.

Having thus described my invention, what I claim as new, and desire to secure by Letters Patent, is—

1. The compensating features of the posts, whether effected by the formation of the gains or by keys, substantially as and for the purpose set forth.

2. The combination of posts P P′ P″, when provided with square or dove-tail gains, with sills A A′, and keys *e e e e*, substantially as and for the purpose specified.

ROBERT RAMSEY.

Witnesses:

J. R. HUNTER,

ANDREW R. SLOAN.